Patented July 12, 1949

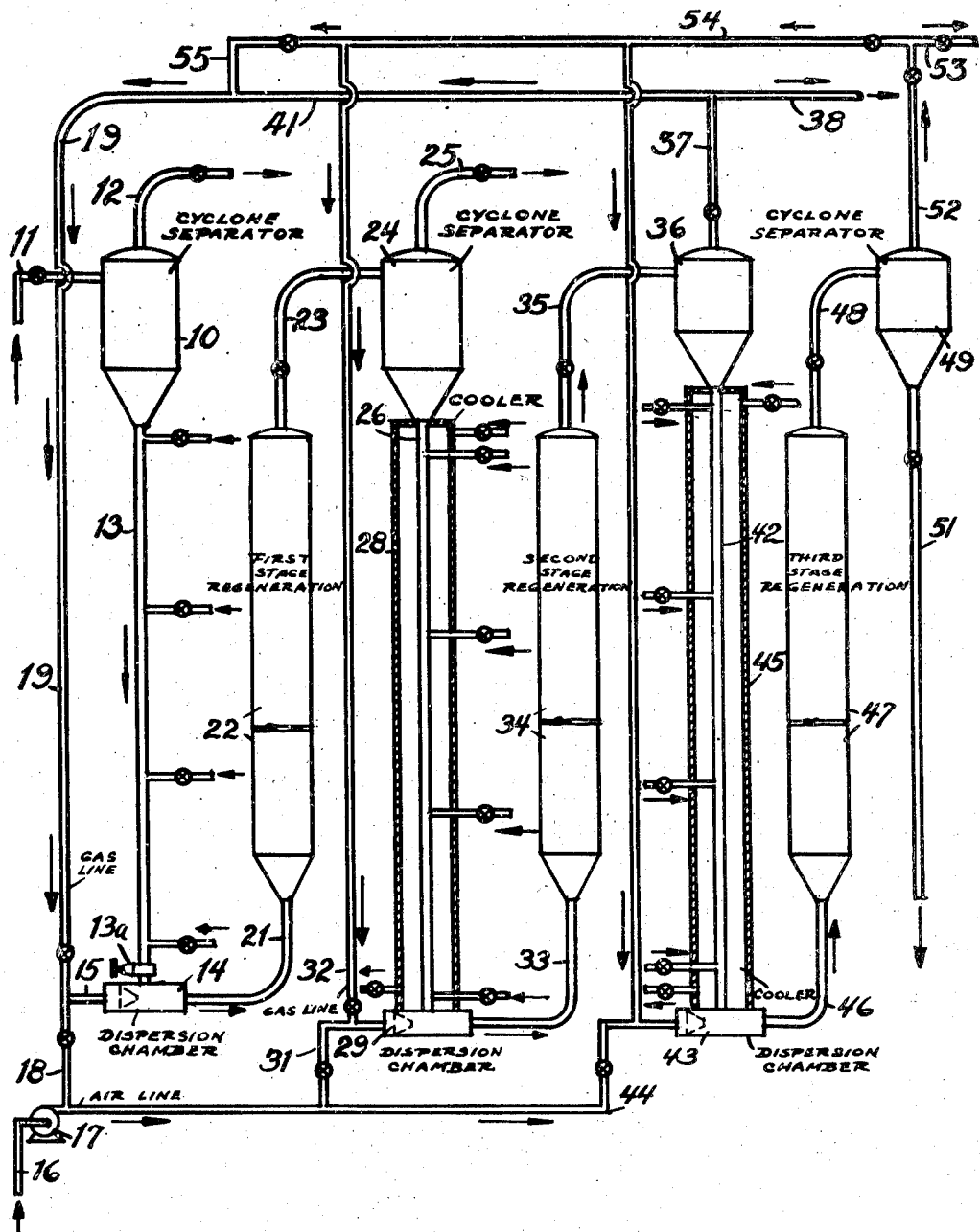

2,475,650

UNITED STATES PATENT OFFICE 2,475,650

MULTISTAGE PROCESS OF REGENERATING A FLUIDIZED CATALYST

William I. Thompson, Elizabeth, and Charles W. Tyson, Summit, N. J., assignors to Standard Oil Development Company, a corporation of Delaware Application October 28, 1943, Serial No. 508,044

3 Claims. (Cl. 252—417)

This application relates to a method of regenerating catalysts and pertains more particularly to a method of removing combustible deposits from finely-divided catalyst powder.

It has previously been proposed to crack catalytically hydrocarbon oils in which the catalyst employed is present in powdered form. In such procedure, the powder is usually dispersed into the stream of oil vapors to be cracked and the resulting dispersion passed through a cracking zone. During the course of the reaction the catalyst becomes contaminated with carbonaceous deposits which reduces the activity of the catalyst for bringing about the desired reaction. The present invention is directed to a method of regenerating such powder to restore its activity for further use in the cracking operation. In order to restore the activity of the catalyst, it is a practice to subject the catalyst to an oxidizing gas to burn the carbonaceous deposits from the catalyst. This regeneration can be accomplished, for example, by suspending the catalyst containing the combustible deposits in a stream of oxidizing or regenerating gas and passing the resulting stream through a regenerating zone followed by separation of the regenerated catalyst from the regenerating gas. During the course of such regeneration, however, it is necessary to regulate carefully the temperature thereof to maintain the same below a maximum beyond which the activity of the catalyst would be reduced.

One of the principal objects of the present invention is to provide an improved method of regeneration of catalyst of this character in which the regeneration can be carried out more rapidly and efficiently with minimum of operating equipment.

Other objects and advantages of the invention will be apparent from the more detailed description hereinafter, in which reference will be made to the accompanying drawing which is a diagrammatic illustration of an apparatus suitable for carrying the invention into effect.

Referring to the drawing, the reference character 10 designates a storage hopper in which the spent catalyst to be regenerated is collected. Such catalyst may, for example, be segregated from cracked products which have previously undergone a cracking operation. For example, the cracked products containing the catalyst in suspension therein may be introduced into a suitable separator such as a cyclone separator located in the top of the hopper 10 through line 11. In such case the cracked products segregated from the powdered material in the cyclone separator are removed therefrom through line 12 and passed to suitable fractionating or purifying equipment for segregation of the desired product therefrom.

The spent catalyst separated from the cracked products passes through a vertical conduit 13 provided with control valve 13—A into a dispersion chamber 14 in which it is intermixed with a regenerating gas introduced through line 15. Such gas may be air or air diluted with other gas and may be introduced into the system through line 16 and compressor 17 from which it is passed through branch line 18 to the dispersion chamber 14.

The dispersion of regenerating gas and powder formed in the dispersion chamber 14 must be under at least a pressure sufficient to overcome the pressure drop through the regenerating circuit or at least through certain stages of the regenerating circuit. It is therefore necessary to impose the desired pressure on the powdered material being introduced into the dispersion zone. This can be accomplished, for example, by constructing the conduit 13 in the form of a vertical standpipe in which the spent catalytic material is maintained in a freely flowing state. In such case a pressure is developed at the bottom of the standpipe and the height of the tower can be regulated so as to provide sufficient pressure at the bottom thereof to feed the powdered material into the dispersion chamber 14. In order to maintain the spent catalyst in a freely flowing state in the vertical standpipe 13, a fluidizing gas may be introduced into the column at one or more vertical points as shown. This fluidizing gas may be an inert gas such as steam, nitrogen, carbon dioxide, or the like, or it may be a gas capable of having a modifying effect on the catalyst.

In addition to, or in lieu of the fresh regenerating air added to the dispersion chamber 14 through line 16, compressor 17 and line 18, a portion of the gas employed in the final stages of regeneration may be introduced into the dispersion chamber 14 through line 19 merging with line 15 as later described in more detail.

The suspension of regenerating gas and powdered catalyst to be regenerated passes from the dispersion chamber 14 through line 21 into a first-stage regenerator 22 in which the mixture is maintained for a period insufficient to regenerate completely the powdered material.

The velocity of the regenerating gas carrying the powder therein passing through the first-stage regenerator 22 may be sufficiently high so that the residence time of the powder in the regenerating zone is not appreciably longer than the length of time of the regenerating gas therein. It is preferred, however, to pass the regenerating gas at relatively low velocity such as below 10 feet per second so that the time of residence of the catalyst within the regenerator 22 is materially longer than the time required for the passage of regenerating gas therethrough. In other words, the concentration of the powder in the regenerating gas undergoing regeneration within the regenerator is materially higher than the concentration in the stream of regenerating gas and powder passing thereto. For example, the density of the material within the regenerator should be at least twice the density of the material passing thereto and preferably materially higher.

In any event the regenerating gas and powder after passing through the first-stage regenerating zone 22 pass through line 23 to a cyclone separator 24 or other suitable separator for the segregation of the regeneration gas from the powder. The regenerating gas segregated from the powder in the cyclone 24 is removed therefrom through line 25 and may be rejected from the system or may be passed through further purification equipment for the final separation of powdered material from the gas. Such further purification equipment, for example, may comprise additional cyclone separators, Cottrell precipitators, filter bags, or the like.

During the course of passage of the powder through the regenerating zone 22, the temperature is increased to a material extent. For example, the temperature of the suspension passing into the regenerator may be of the order of from 700° to 850° F. and the temperature of the products leaving the first-stage regenerator may be of the order of 1000° to 1200° F.

In view of this, it is desirable in most cases to subject the partially regenerated catalyst segregated in the first cyclone 24 to a cooling treatment prior to passing the same to the next stage of regeneration. To accomplish this the catalyst separated in the cyclone 24 may discharge into a vertical column 26 which is surrounded by a cooling jacket 28 into which a cooling agent of any suitable character may be introduced and removed. The conduit 26 may take the form of a vertical standpipe for building up additional pressure on the powder prior to passing the same to further regeneration. In such case, it may be desirable to add a fluidizing gas at one or more spaced points along the column 26 to maintain the powder in freely flowing condition to develop thus the desired pressure at the bottom of the tower. The partially regenerated catalyst passes from the conduit 26 into a second dispersion chamber 29 in which it is mixed with additional regenerating gas introduced through line 31. This regenerating gas stream may, for example, consist of fresh air introduced through line 16 and compressor 17 and branch line 31, or it may consist of a stream of gas which has already been employed for carrying out the final stages of regeneration as described in more detail hereinafter. This recycle gas may, for example, be introduced into the dispersion chamber 29 through line 32. In any event, the dispersion of partially regenerated powder and regenerating gas formed in the dispersion chamber 29 passes through line 33 to a second-stage regenerating zone 34 in which further regeneration is accomplished. This regenerating chamber may be of the same construction as that in the first stage of regeneration and the velocity of the regenerating gas passing therethrough may be controlled in the same manner. The suspension of regenerating gas and powder after passing through the second-stage regenerator 34 passes through line 35 to a further separator 36 in which the powder is separated from the regenerating gas. The regenerating gas employed in the second stage of regeneration is removed from the separator 36 through line 37. This product may be rejected from the system through line 38. This regenerating gas in many cases, however, may have excess of oxygen which may be employed to advantage in carrying out the initial stages of regeneration and since it may be at a higher pressure than the pressure of the first stage of regeneration, it may be passed through line 41 and line 18 to the dispersion chamber 14 and there intermixed with fresh regenerating gas and spent catalyst passing to the first regenerating zone.

Powder separated in the second cyclone 36 may be passed through a conduit 42 to a further dispersion chamber 43 and there intermixed with additional regenerating gas introduced through line 44. If desired, the product passing through the vertical conduit 42 may be subjected to cooling to reduce the temperature thereof before passing to the final stage of regeneration. To this end, the conduit 42 may also be provided with a cooling jacket 45. Any suitable cooling medium may be passed through the jacket 45 for bringing the temperature of the powder to the desired level before passing to the dispersion chamber 43.

The regenerating gas admixed with the powder in the dispersion chamber 43 is preferably undiluted air and may even be enriched with oxygen or other oxidizing gas before being admixed with the powder. The dispersion of powder and regenerating gas formed in the dispersion chamber 43 passes through line 46 to a final-stage regenerating chamber 47 in which the regeneration is completed. Here, too, the velocity of the regenerating gas may be controlled as described in connection with the first regenerating zone to maintain the powder within the regenerating zone for any desired period to complete the regeneration.

The suspension of regenerated catalyst and gas removed from the final regenerating chamber 47 passes through line 48 to a suitable separator such as a cyclone separator 49 in which the regenerated catalyst is segregated from the regenerating gas. The regenerated catalyst separated in the separator 49 is withdrawn therefrom through line 51 and may be passed in a continuous manner to a suitable catalytic cracking unit (not shown). The regenerating gas separated from the regenerated catalyst in the cyclone separator 49 is withdrawn therefrom through line 52 and may be rejected from the system through line 53. However, this gas normally contains a substantial excess of oxygen which may be used to advantage in carrying out either the first or second stages of regeneration. To this end the regenerating gas or a portion thereof from the separator 49 may be passed through lines 52, 54 and 32 to the inlet of the dispersion chamber 29 and there intermixed with powdered catalyst which has undergone the initial stages of regeneration. As a further alternative, the regenerating gases recovered from the final stages of regeneration or a portion thereof may be passed through lines 52, 54, 55, 41 and 19 to the dispersion chamber 14 in which it is mixed with spent catalyst with or without fresh air introduced through line 18 prior to passing the same to the first regenerating zone 22.

One of the important features of the present invention is to carry out the regeneration in successive stages with the progressively increasing oxygen concentration in the individual stages.

A further important phase of the invention is to carry out the regeneration in successive stages with progressively increasing pressure in the separate stages. It has been found that the time required for regeneration can be reduced by using either of these two phases of the invention. The pressure built up on the powder between the individual stages of regeneration can be developed by the use of suitable vertical towers as illustrated, or other equivalent devices for imposing pressure on powder may be employed in lieu thereof, such as compression screws, pressure hoppers, and the like.

It has previously been known that the time required for removing a given amount of combustible deposits from the catalyst mass is a function of the amount of such combustible deposits thereon. From this it follows that as the regeneration proceeds the rate of reaction tends to diminish unless further compensating action is taken. In accordance with the present invention, the regenerative reaction is accelerated in the final stages of regeneration by increasing the oxygen concentration of the regenerating gas and by increasing the total pressure on the regenerating gas stream which in turn increases the partial pressure of the oxygen in the regenerating gas.

Having described the preferred embodiment of the invention it will be understood that it embraces such other variations and modifications as come within the spirit and scope thereof.

This application is a continuation-in-part of copending application Serial No. 378,584, filed February 12, 1941 (now U. S. Patent No. 2,434,602).

What is desired to be protected by Letters Patent is:

1. A continuous method of regenerating finely-divided contact material containing combustible contaminants which comprises suspending said finely-divided material in a stream of regenerating gas containing free oxygen, passing the resulting suspension through a first regenerating zone, controlling the conditions within said regenerating zone to partially regenerate said material during passage therethrough, thereafter separating the partially regenerated contact material from said regenerating gas, introducing said partially regenerated contact material into a second stream of regenerating gas containing free oxygen, passing the resulting mixture through a second regenerating zone separate and independent from said first-named regenerating zone while simultaneously introducing a fresh suspension of finely-divided contact material containing combustible contaminants into said first regenerating zone, regulating the conditions in said second-named zone while maintaining a higher inlet oxygen concentration than in said first-named regenerating zone to further regenerate said contact material and thereafter separating said contact material from said second stream of regenerating gas, the regenerating operations with relatively low and high inlet oxygen concentration in said first and second regeneration zones respectively taking place simultaneously.

2. Method according to claim 1 in which the suspension of contact material and regenerating gas is passed upwardly through each regenerating zone while controlling the velocity of the regenerating gas so that the time of passage of the contact material through the regenerating zone is materially greater than the time of the passage of the regenerating gas.

3. Method according to claim 1 in which the regenerating gas separated from the contact material removed from the second regenerating zone, is passed to the first regenerating zone.

WILLIAM I. THOMPSON.
CHARLES W. TYSON.

REFERENCES CITED

The following references are of record in the file of this patent:

UNITED STATES PATENTS

| Number | Name | Date |
|---|---|---|
| 1,577,534 | Miller | Mar. 23, 1926 |
| 2,199,838 | Tyson | May 7, 1940 |
| 2,273,076 | Voorhees | Feb. 17, 1942 |
| 2,311,564 | Munday | Feb. 16, 1943 |
| 2,320,273 | Gohr et al. | May 25, 1943 |
| 2,327,489 | Becker | Aug. 24, 1943 |
| 2,434,602 | Thompson | Jan. 13, 1948 |